(No Model.)
J. W. EMSLEY.
BICYCLE.
No. 362,500. Patented May 10, 1887.
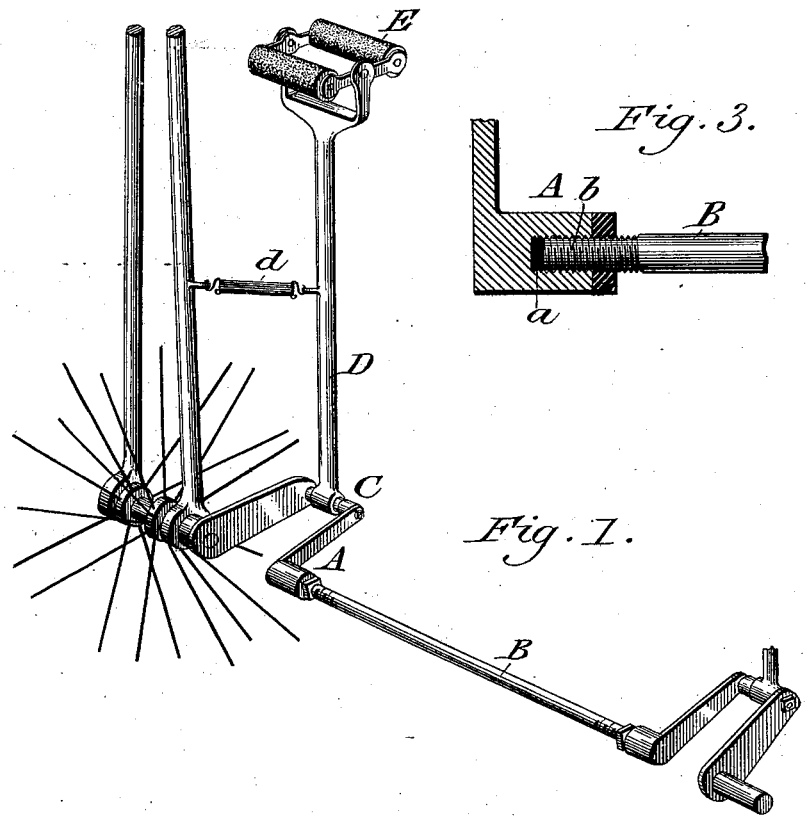
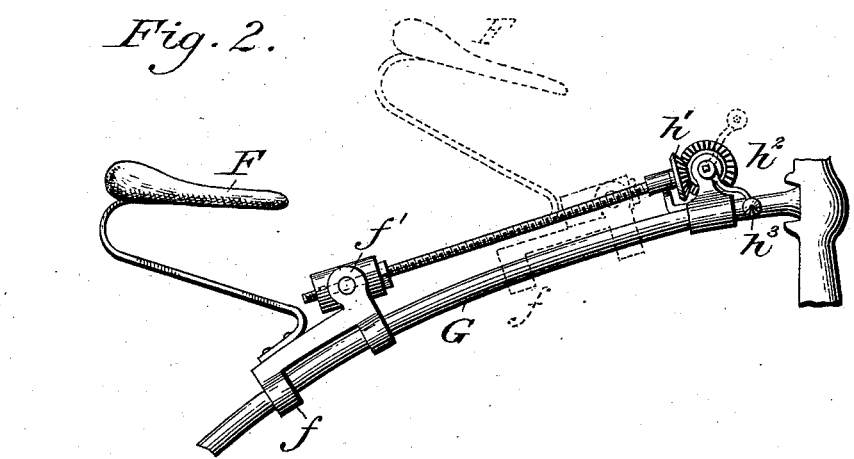
WITNESSES:
INVENTOR
John William Emsley

UNITED STATES PATENT OFFICE.

JOHN WILLIAM EMSLEY, OF PHILADELPHIA, PENNSYLVANIA.

BICYCLE.

SPECIFICATION forming part of Letters Patent No. 362,500, dated May 10, 1887.

Application filed December 17, 1886. Serial No. 221,834. (No model.)

*To all whom it may concern:*

Be it known that I, JOHN WILLIAM EMSLEY, of the city and county of Philadelphia, State of Pennsylvania, have invented a new and useful Improvement in Bicycles, of which the following is a true and exact description, due reference being had to the drawings which accompany and form part of this specification.

My invention consists in a novel method of construction whereby two bicycles may be so connected with each other that they will travel together; also, an improvement whereby the driving-wheel of the bicycle may be of any diameter, and yet be operated by the driver from the saddle. My invention also consists in so attaching the saddle upon the machine that the driver can at will allow it to pass down upon the rib of the machine, and thus move the position of the weight on the machine at will.

My improvement first above stated is constructed and operated in the following manner.

In Figure 1, C represents the bar which supports the treadle of an ordinary machine. To the bar carrying the treadle, and at its outer end, I attach, by means of bolts or any other suitable means, the elbow-piece A, preferably made of metal. In the horizontal portion of this piece I construct a threaded socket, a, Fig. 3, the rod B, Figs. 1 and 3, the end of which, b, is threaded to correspond with the threaded socket a. The other end of this rod is also threaded, and can be screwed into a corresponding threaded socket, which is attached to the other bicycle in a manner similar to that already described. One end of this rod has a right-hand thread, while the other end has a left-hand thread, the corresponding sockets being correspondingly threaded. The elbow-piece A may remain on the bicycle, or may be placed there when it is desired to connect two bicycles. In operation, when desired to connect the bicycles, the rod B is screwed into the sockets a of the elbow-piece A, which is attached as heretofore described.

The construction and operation of my method of operating a driving-wheel of large diameter are as follows:

To the bar C, Fig. 1, which holds the treadle in an ordinary bicycle, I attach the upright bar D, Fig. 1, having at its upper end any desired form of foot-treadle, one of which is shown at E, Fig. 1. The spring $d$, one end of which is attached to the bar D and the other to one of the upright supports of the frame of the machine, as shown at $d'$, Fig. 1, keeps the upright D in proper position.

My improvement, by which I am enabled to allow the saddle of a bicycle to pass down the rib and thus enable the driver to regulate the position of the weight on the rib of the machine, may be operated by any suitable mechanism by which the saddle is enabled to change its position on the rib.

In Fig. 2 one method is shown, the dotted lines showing the saddle in its normal position when the rider is operating the treadles from the top of the machine, the full lines showing the saddle when it has passed to its limit down the rib.

F represents the saddle with its friction-bearing $f$ on the rib G.

H represents a screw operated by the bevel-gearing $h' h^2$. This gearing is normally idle. By means of the pawl-rod $h^3$ the bevel-gearing is operated. The friction-bearing $f$ is connected with the screw-gearing by means of the threaded nut $f'$ when the pawl-rod $h^3$ operates the bevel-gearing as aforementioned. The threaded nut $f'$ is thus caused to pass downward, thus causing the saddle to move upon the rib G. The speed can be regulated by regulating the friction, and the driver can operate the bevel-gearing at any desired speed.

The device hereinbefore described for connecting the bicycles may be attached to the traveling or smaller wheel, as well as the driving-wheel, if so desired.

Having now described my invention, what I claim as new, and desire to secure by Letters Patent, is—

1. In a bicycle, the combination of rod B and elbow-piece A, both constructed and acting substantially as and in the manner specified.

2. The combination of the saddle F, having friction-bearing $f$ and nut $f'$, screw H, bevel-gearing $h' h^2$, and pawl-rod $h^3$, all constructed and operating substantially as and for the purpose specified.

JOHN WILLIAM EMSLEY.

Witnesses:
RICHD. S. CHILD, Jr.,
FRANK CROWNE.